United States Patent
Taylor

(10) Patent No.: US 10,757,916 B1
(45) Date of Patent: Sep. 1, 2020

(54) SUPPORT DEVICE FOR DOG EAR

(71) Applicant: Alana P Taylor, Mobile, AL (US)

(72) Inventor: Alana P Taylor, Mobile, AL (US)

( * ) Notice: Subject to any disclaimer, the term of this patent is extended or adjusted under 35 U.S.C. 154(b) by 135 days.

(21) Appl. No.: 16/214,750

(22) Filed: Dec. 10, 2018

Related U.S. Application Data

(60) Provisional application No. 62/598,040, filed on Dec. 13, 2017.

(51) Int. Cl.
*A01K 13/00* (2006.01)
*A01K 29/00* (2006.01)

(52) U.S. Cl.
CPC .............. *A01K 13/00* (2013.01); *A01K 29/00* (2013.01)

(58) Field of Classification Search
CPC .............................. A01K 13/00; A01K 13/006
USPC ....... 119/600, 601, 814, 815, 821, 850, 855, 119/856, 857, 863, 865, 858; 54/67; D30/152; 602/18, 60, 61
See application file for complete search history.

(56) References Cited

U.S. PATENT DOCUMENTS

| | | | |
|---|---|---|---|
| 3,970,080 A | 7/1976 | White | |
| 4,148,279 A * | 4/1979 | Hoytt | A61D 9/00 119/814 |
| 4,275,715 A | 6/1981 | Wolfe | |
| 5,356,431 A | 10/1994 | Pierce | |
| 5,540,189 A * | 7/1996 | Masson | A01K 13/006 119/814 |
| 6,039,751 A | 3/2000 | Hardee | |
| 7,743,736 B2 * | 6/2010 | Winestock | A01K 13/006 119/814 |
| 7,946,254 B2 * | 5/2011 | Chao | A01K 13/00 119/814 |
| 7,946,256 B2 * | 5/2011 | Mann | A01K 13/006 119/850 |

* cited by examiner

*Primary Examiner* — Richard T Price, Jr.
(74) *Attorney, Agent, or Firm* — George L Williamson

(57) ABSTRACT

Method and apparatus for supporting the ears of a dog in an upright position following cosmetic otoplasty having a softer outer portion and a stiffer inner core portion for providing effective and sufficient structural support for maintaining the device and the pinna in an upright position. The device has a lower support post portion and an upper spade-shaped portion designed to conform to the shape of the cropped ears of the dog. The device includes a spherical enlargement on a lower end for insertion into the inner ear portion of the dog's ear along with an adhesive layer for securing the convex surface of the device to the interior surface of the ear of the dog.

20 Claims, 3 Drawing Sheets

SUPPORT DEVICE FOR DOG EAR

RELATED APPLICATIONS

This application claims benefit of U.S. Provisional Patent Application No. 62/598,040 filed on Dec. 13, 2017.

BACKGROUND OF THE INVENTION

Field of the Invention

The present invention relates generally to appurtenances for dogs and, more particularly, is concerned with a support for a dog's ear following cosmetic otoplasty.

Cosmetic otoplasty, also known as "cropping" a dog's ears, has been practiced by people for centuries. Once the dog's ears have been cropped, the ears must be held in an upright, erect position for a period lasting from a few weeks to several months in order for the ears to stand/erect by themselves. To hold the dog's ears upright and erect, people craft devices sometimes referred to as "ear posts" or "posting". There is not much available to aid people in posting their dogs ears. Breeders, pet owners and even veterinarians use materials such as duct tape and hangers to act as posts. Crafting these handmade dog's ear posts can be time consuming and messy. The posts often warp, come off the dog's ears, cause rashes, injuries, and even bacterial or fungal infections. It is usually difficult for a new puppy owner to learn how to craft dog's ear posts at home when they bring home a new puppy with cropped ears.

Description of the Related Art

Devices relevant to the present invention have been described in the related art; however, none of the related art devices disclose the unique features of the present invention.

In U.S. Pat. No. 3,970,080 dated Jul. 20, 1976, White disclosed an animal ear support device; however, this device is made of light pliable material unlike the present invention. In U.S. Pat. No. 6,039,751 dated Mar. 21, 2000, Hardee disclosed a support device for newly cropped ears of dogs; however, this device is made of a monolithic material unlike the present invention. In U.S. Pat. No. 5,356,431 dated Oct. 18, 1994, Pierce disclosed a connective tissue stabilizer and method of use. In U.S. Pat. No. 4,275,715 dated Jun. 30, 1981, Wolfe disclosed an ear rack for supporting dog ears erect.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a device for supporting the ears of a dog in an upright position following cosmetic otoplasty having a softer outer portion which contacts the inner ear of the dog which soft, foam-like outer covering is intended to avoid pain, irritation, or damage to the ears of the dog; underlying the softer outer portion is a stiffer inner core portion made of a flexible yet resilient material for providing effective and sufficient structural support for maintaining the device and the pinna of the ear in an upright position as necessary for the ear of the dog to heal. The device also has a lower support post portion and an upper spade-shaped portion which upper portion is generally designed to conform to the shape of the cropped ears of the dog. Additionally, the device includes a spherical enlargement on a lower end of the lower support post for insertion into the inner ear portion of the dog's ear along with an adhesive layer for securing the convex surface of the device to the interior surface of the ear of the dog.

An object of the present invention is to provide a device for supporting the cropped ears of a dog in an upright position for proper healing following cosmetic otoplasty. A further object of the present invention is to provide a device having a soft outer portion for contacting the ears of a dog so as to avoid injury to the ears of a dog. A further object of the present invention is to provide a device having a spherical enlargement on its lower end to assist in supporting the device in an upright position inside the ears of a dog. A further object of the present invention is to provide a device which can be easily used by an operator. A further object of the present invention is to provide a device which can be relatively easily and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
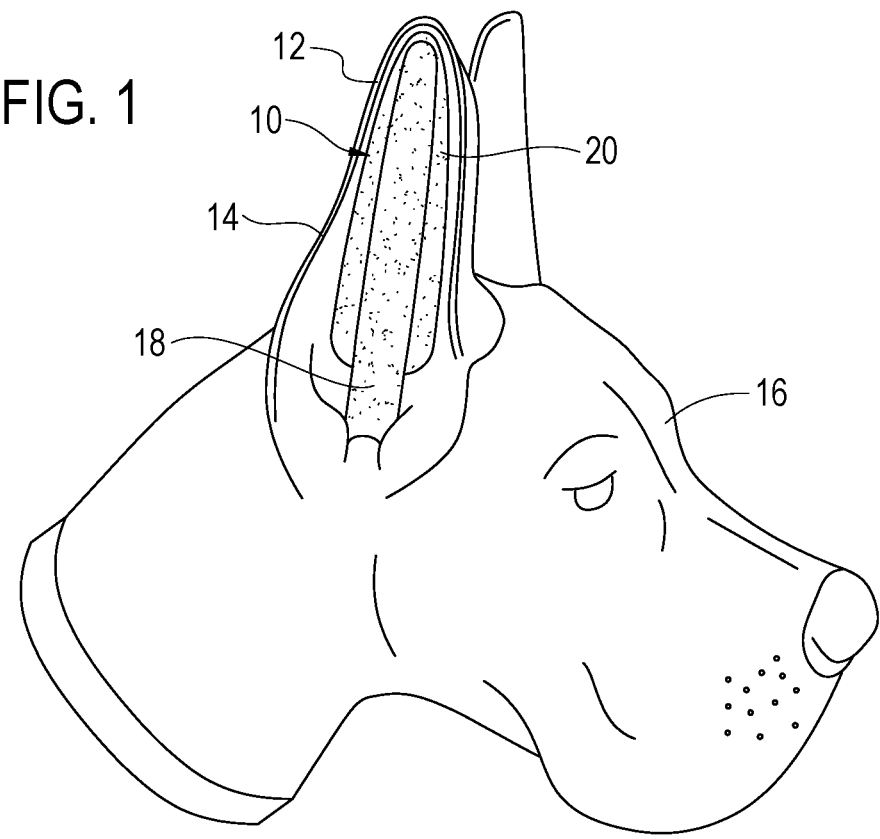
FIG. 1 is a perspective view of the present invention shown in operative connection.

With regard to reference numerals used, the following numbering is used throughout the drawings.

10 present invention
12 pinna
14 ear of dog
16 dog 18 lower support post
20 upper spade-shaped portion
22 inner core
24 outer covering
26 upper tip
28 spherical enlargement
30 convex surface
32 interior surface of dog ear
34 adhesive layer
36 bell of ear
38 outer structure of ear
40 ear canal
42 upper tip of ear
44 concave surface
46 lower rounded end
48 lower end of spade-shaped portion
50 peel-off layer

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 9 illustrate the present invention wherein a support for the ears of a dog following cosmetic otoplasty is disclosed and which is generally indicated by reference number 10.

Turning to FIG. 1, therein is shown the present invention 10 disposed on the interior surface of a pinna 12 of the ear 14 of a dog 16 wherein the present invention 10 has a lower support post portion 18 along with an upper spade shaped portion 20 wherein the present invention 10 is generally disposed in an upright position wherein the lower support post 18 maintains the present invention 10 in a generally upright position inside the ear 14 of a dog 16 for supporting the pinna 12 in an upright position.

Figure 2:
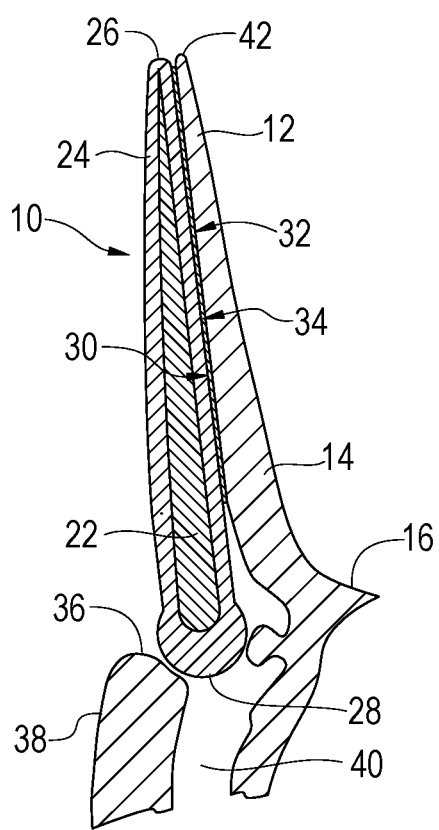
FIG. 2 is a cross-sectional view of the present invention shown in operative connection.

Turing to FIG. 2, therein is shown the present invention 10 disposed on the interior of the pinna 12 of the ear 14 dog 16 wherein the present invention has a stiffer inner core portion 22 which is yielding and somewhat pliable along with a softer outer covering 24 along an upper tip 26 and a lower spherical enlargement 28 on the lower end of the lower post 18 of the present invention 10. The spherical enlargement 28 is generally disposed on the outer structural portion 38 of the ear 14 of the dog and rests generally on what is commonly referred to as the bell portion 36 of the ear of the dog. Also shown is ear canal 40 of the ear 14 of the dog 16. The convex surface 30 of the present invention 10 rests against the interior surface 32 of the ear 14 of the dog and is held to the interior surface 32 by a layer of adhesive 34 disposed between the convex surface 30 and the interior surface 32 of the ear of the dog. Also shown is the upper tip 42 of the ear 14 of the dog 16. Core portion 20 generally gets smaller having a decreasing diameter from its lower end toward its upper tip 26.

Figure 4:
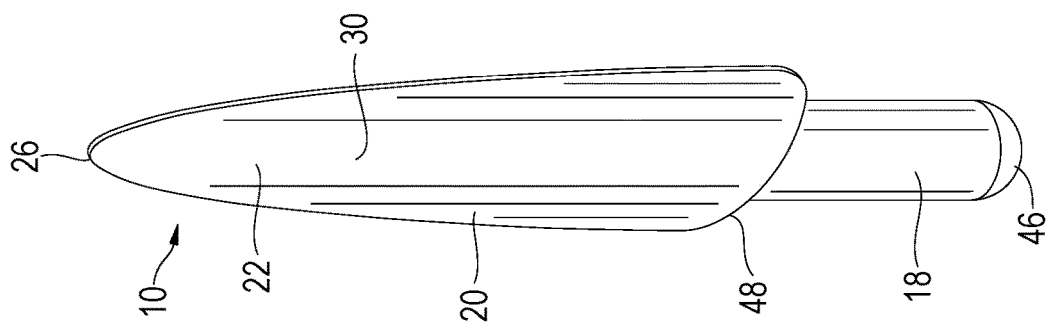
FIG. 4 is a perspective view of the convex surface of the present invention.
Figure 3:
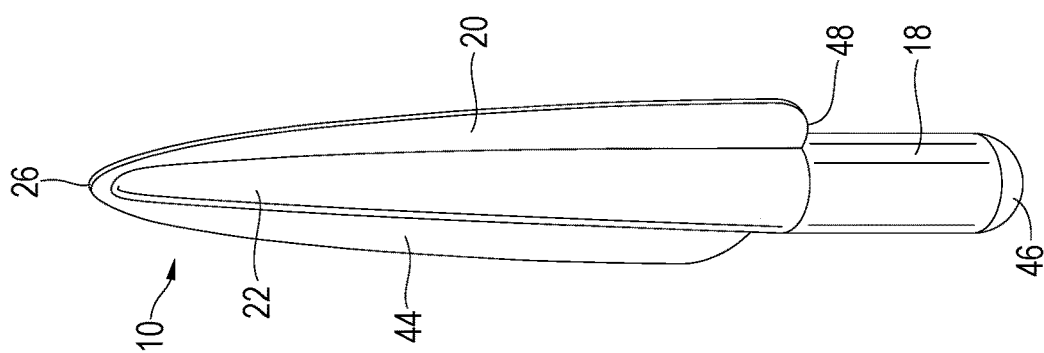
FIG. 3 is a perspective view of the concave surface of the core of the present invention.

Turning to FIGS. 3 and 4, therein are shown the inner core portion 22 along with its concave surface 44 and convex surface 30, respectively. Also shown is the lower post portions 18 and the upper spade-shaped portions 20 of inner core 22 wherein the lower ends 46 of the post portions 18 are rounded; post portion 18 extends from lower end 46 to lower ends 48 of the spade-shaped portion. The upper spade-like shaped portions 20 of the present invention 10 are wider along the horizontal axis at its lower ends 48 while terminating in an upper tip 42 so that it narrows in width from its lower end to its upper tip giving it a spade shape.

Figure 6:
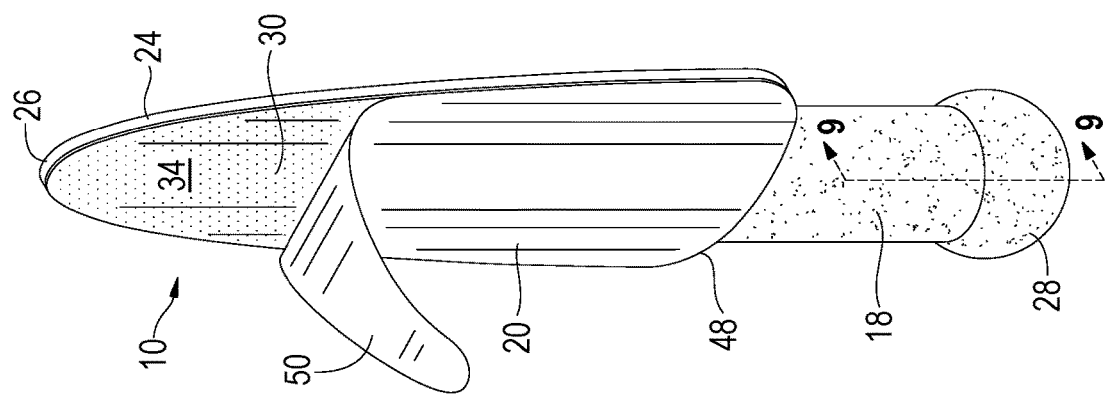
FIG. 6 is a perspective view of the convex surface of the present invention.
Figure 5:
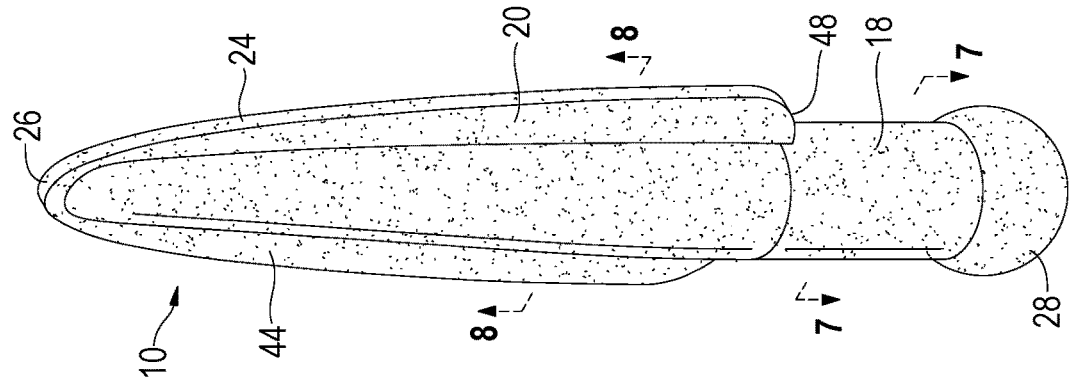
FIG. 5 is a perspective view of the concave portion of the present invention.

Turning to FIGS. 5 and 6, therein is shown the outer covering 24 formed over the inner core portions (not visible) 22 showing the lower post portions 18 along with the upper spade-shaped portions 20, being broader at their lower ends 48 and terminating at an upper tip 42 wherein FIG. 5 shows the concave side 44 of the present invention and FIG. 6 shows the convex side 30 of the present invention 10. FIG. 6 also shows the adhesive layer 34 along with a removable peel-off covering layer 50 to illustrate that it is required to remove the peel-off layer 50 from the adhesive layer 34 before the adhesive layer is pressed onto the interior surface of the dog ear 32 as previously disclosed in FIG. 2.

Figure 7:
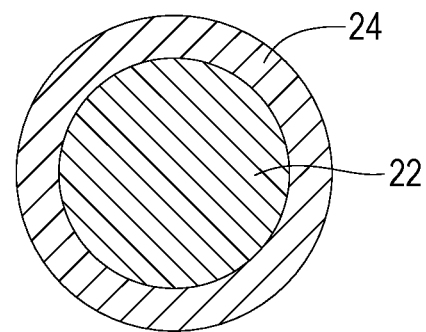
FIGS. 7 and 8 are cross-sectional views of the present invention taken from FIG. 5 as indicated.

Turning to FIG. 7, therein is shown the inner core 22 along with its outer covering 24.

Figure 8:
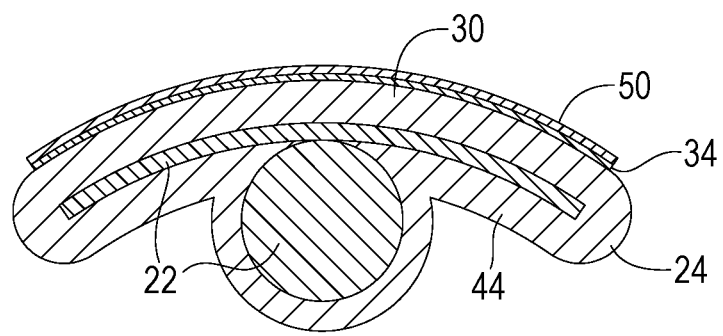

Turning to FIG. 8, therein is shown the inner core 22 along with its outer covering 24 along with an adhesive layer 34 covered by its peel-off layer 50 and its concave and convex surfaces 44 and 30. It can be seen that the inner core 22 serves as a rib-like structural support member inside the outer covering 24.

Figure 9:
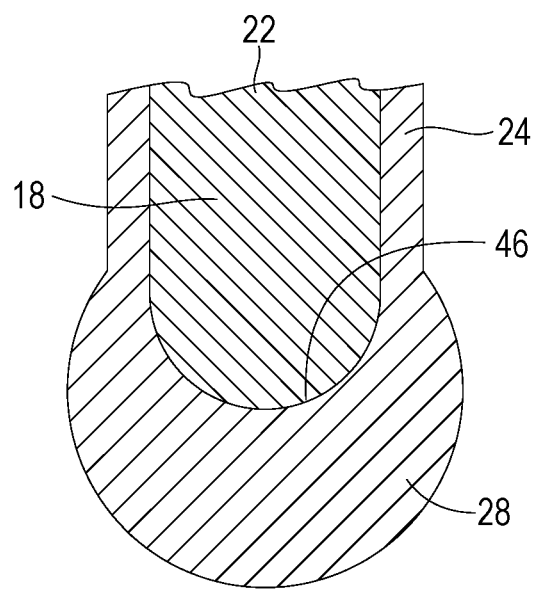
FIG. 9 is a cross-sectional view of the present invention taken from FIG. 6 as indicated.

Turning to FIG. 9, therein is shown the inner core 22 along with its outer covering 24 including the enlargement 28 on the lower rounded end 46 of the lower post 18. The enlargement 28 portion is thicker than the proximate layer of outer covering 24 in order to provide additional cushioning layer between the weight bearing lower end of the present invention 10 and the ear 14 of the dog 16.

The following additional general description makes reference to FIGS. 1-9. The present invention 10 can be created in all lengths, widths and heights to fit any breed of dog that has undergone any of the varying types of cosmetic otoplasty surgeries. The present invention 10 is to be placed up against the inside 32 of the ear 14 of the canine 16, known as the pinna 12, with the hemispherical end 28 of the structure downward and resting near the entrance of the dogs vertical ear canal 40, but never does the structure enter inside the dog's ear canal. The present invention 10 should be longer than the length of the canine's ear 14 so that the excess length of the structure rising above the dogs ear tip 42 can be cut off with scissors in order to make the structure weigh less and cause less irritation to the canine 16. One device 10 should be used for each of a canines ears 14 to hold them in an erect position. The present invention 10 can be made in several lengths and widths, to be used for several different breeds of dogs 16 and several different types of cosmetic otoplasty procedures. The present invention 10 can be as much as 10" in height, as much as 4" in width and as much as 2" in depth. The dimensions of the present invention 10 should be sized to meet the needs of several breeds, sizes and ages of canines 16.

The shape of the present inventions 10 is achieved by a mold created of any mold making agent that will not negatively affect the product poured into the mold or add any residue/material that is considered harmful/toxic to canines 16 in the product poured into the mold. One mold is for the casting of the inner layer 22 of the invention 10 and the second mold is for casting the exterior layer 24 of the invention.

The following are brief step by step instructions on how to cast and combine the layers of materials/foam to create the current invention 10: a) The inner layer 22 is cast in the first mold using the dense material, e.g., rubber, and allowed to fully cure; b) The inner layer 22 is then placed into the second mold and the less dense liquid foam material is poured into the mold with the inner layer and allowed to cure which creates the exterior layer; c) The product may need trimming of excess foam that leaked during the curing process; d) Remove the cured foam from the mold. Depending on many factors, a mold release agent may be needed. The inner layer 22 should now be inside or partially inside the exterior layer 24; and, e) The adhesive 34 is applied and covered with the removable backing 50.

The present invention 10 can be made of various types of foam, latex, rubber, plastic and/or any materials that are suitable for their intended purposes and found to be non toxic to canines once cured/completed; colorants can be added to the product prior to the curing process. The present invention 10 can potentially be created in any and all colors and/or color patterns and colorants can potentially be added after the curing process of the invention. Further, the foam-like material may be treated with antimicrobial additives prior to the curing process which give the cured structure antibacterial and antifungal properties. These antibacterial and antifungal properties are added to the present invention 10 with the intention of helping to inhibit the growth and/or multiplication of bacteria and funguses on the canines ear 14 and/or on the structure itself. The antimicrobials can be used in liquid or powder forms. A pressure sensitive adhesive 34 is applied to the side of the structure that is intended to rest up against the canines part of the ear known as the pinna 12 and the adhesive is covered with a removable backing/release liner 50 in order to preserve the pressure sensitive adhesive and to help ensure that its properties remain intact. Adhesives 34 that are non toxic to canines 16 and that can be removed from the pinna 12 without harming the canine are used.

I claim:

1. A support device for a dog ear, comprising:
   a) an elongated core having a portion spade-shaped in cross section and a support post nestled in a concave surface of said spade-shaped portion, said support post extending past and terminating below said lower end of said spade-shaped portion;
   b) said elongated core narrowing from lower ends thereof to upper ends of said core, the upper end of said spade-shaped portion terminating above the upper end of said support post;
   c) said elongated core being of rigid but yielding material;
   d) an outer covering of soft cushioning material fully enclosing said elongated core;
   e) said outer covering having a spherical enlarged bottom end sufficiently large to rest on a bell portion of the ear of said dog; and
   f) an adhesive layer along a portion of a convex outer surface of said elongated core for releasably adhering said core to said ear for serving as a rib-like structural support member for holding said ear in an erect position.

2. The support device of claim 1, wherein said device is made in several sizes so that a particular device is selected for a length, width and height to fit any breed and size dog, and in which the adhesive layer is provided with a peel-off backing which is removed to allow installation of said device on said dog.

3. The support device of claim 2, wherein said core and cushioning are made from materials selected from the group consisting of foam, latex, rubber, and plastic.

4. The support device of claim 3, wherein said core is made from rubber.

5. The support device of claim 4, wherein said cushioning material is a foam.

6. The support device of claim 5, wherein said outer foam has been treated with an antimicrobial additive prior to any curing process to give the cured material antibacterial and antifungal properties.

7. A method of using a device to hold the ear of a dog erect for a period of time to recover from a cosmetic otoplasty, comprising the steps of:
   a) said device having an elongated core having a portion spade-shaped in cross section and a support post nestled in a concave surface of said spade-shaped portion, said support post extending past and terminating below a lower end of said spade-shaped portion, said elongated core narrowing from lower ends thereof to upper ends of said core, the upper end of said spade-shaped portion terminating above the upper end of said support post fully enclosing said support post, said elongated core being of stiff but yielding material, and having an outer covering of soft cushioning material fully enclosing said elongated core, said outer covering having a spherical, enlarged bottom end;
   b) placing said device along an inner surface of said ear with said spherical, enlarged bottom end of said core resting on a bell portion of the ear of said dog, said spherical, enlarged bottom being sufficiently large so as to never enter said ear canal, said device extending up from said bell portion for holding said ear in an erect position; and
   c) using an adhesive layer on an outer surface of said device in contact with said ear to maintain said ear in said erect position.

8. The method of claim 7, further comprising the step of providing a peel-off backing on said adhesive, said backing being removed prior to mounting of said device on the ear of said dog.

9. The method of claim 8, wherein said core and cushioning are made from materials selected from the group consisting of foam, latex, rubber, and plastic.

10. The method of claim 9, wherein said core is made from rubber.

11. The method of claim 10, wherein said cushioning material is a foam.

12. The method of claim 11, wherein the foam is treated with an antimicrobial additive prior to any curing process to give the cured material antibacterial and antifungal properties.

13. The method of claim 12, wherein said device is longer than the length of the dog's ear so that excess length of the device rising above the tip of the dog's ear can be cut off with scissors to make the device weigh less and cause less irritation to the dog.

14. The method of claim 12, wherein the core is created in a first mold, and the outer covering is added using a second mold, the outer covering being treated with said antimicrobial additive prior to curing thereof.

15. A support device for a dog ear, comprising:
   a) an elongated core having an upper wider portion and a lower support post, said lower support post extending past and terminating below said lower end of said upper wider portion;
   b) said elongated core being of rigid but yielding material;
   d) an outer covering of soft cushioning material fully enclosing said elongated core;
   e) wherein a lower end of said lower support post rests on a bell portion of the ear of said dog; and f) an adhesive layer along a portion of said elongated core for releasably adhering said core to said ear for serving as a rib-like structural support member for holding said ear in an erect position.

16. The support device of claim 15, further comprising a peel-off backing disposed on said adhesive layer wherein said peel-off backing is removed to allow installation of said device on said dog.

17. The support device of claim 16, wherein said core and said outer covering are made from materials selected from the group consisting of foam, latex, rubber, and plastic.

18. The support device of claim 17, wherein said core is made from rubber.

19. The support device of claim 18, wherein said outer covering is a foam.

20. The support device of claim 19, wherein said outer foam has been treated with an antimicrobial additive prior to any curing process to give the cured material antibacterial and antifungal properties.

\* \* \* \* \*